United States Patent
Metzger

[11] 3,711,392
[45] Jan. 16, 1973

[54] METHOD FOR THE UTILIZATION OF ORGANIC WASTE MATERIAL

[76] Inventor: James B. Metzger, 20 Cleveland Lane, Princeton, N.J. 08540

[22] Filed: Feb. 16, 1971

[21] Appl. No.: 115,545

[52] U.S. Cl. ............... 204/180 P, 204/151, 210/11, 204/301
[51] Int. Cl. ............................................. B01d 13/02
[58] Field of Search ....... 204/180 P, 151; 210/11, 15, 210/16, 18, 2; 195/31, 32, 33

[56] References Cited

UNITED STATES PATENTS

| | | | |
|---|---|---|---|
| 2,158,595 | 5/1939 | Slagle | 204/151 |
| 2,259,046 | 10/1941 | Roberts | 204/151 |
| 2,796,395 | 6/1957 | Roberts | 204/151 |
| 2,799,638 | 7/1957 | Roberts | 204/151 |
| 3,268,441 | 8/1966 | Lindstrom | 204/180 P X |
| 3,356,609 | 12/1967 | Bruemmer | 210/11 X |
| 3,383,309 | 5/1968 | Chandler | 210/11 |
| 3,386,910 | 6/1968 | Forrest | 210/11 X |
| 3,462,275 | 8/1969 | Bellamy | 210/11 X |
| 3,562,137 | 2/1971 | Gehring | 204/151 X |

FOREIGN PATENTS OR APPLICATIONS

| | | | |
|---|---|---|---|
| 922,148 | 3/1963 | Great Britain | 204/151 |

Primary Examiner—John H. Mack
Assistant Examiner—A. C. Prescott
Attorney—Joel B. Johnson

[57] ABSTRACT

Biodegradable waste materials are utilized by forming a suspension in a fermentation tank of comminated waste materials mixed with a microbiological system of a plurality of selected types of microorganisms under conditions to decompose the waste materials. After sufficient microbial metabolic action has taken place, gaseous products and microbial-resistant portions of the suspension are removed. The solid proteineous materials are then separated from the liquor formed in the suspension and the components of the liquor are separated by electrodialysis.

37 Claims, 2 Drawing Figures

INVENTOR.
JAMES B. METZGER
BY
AGENT

METHOD FOR THE UTILIZATION OF ORGANIC WASTE MATERIAL

Potential sources of food for human beings include all energy-rich substances or materials that in some way may be turned into protein or fats or carbohydrates suitable for human consumption.

The present sources of human food are inadequate. As the population of the earth grows, increased protein-deficiencies will come into evidence before mass-starvation as such takes place. Whereas a significant proportion of the energy of human beings is derived from the consumption of dairy products, this represents an inefficient source of human food. Only in the highly developed countries, which are at present well-fed, are milk and dairy products consumed in quantity. The same rationale may be used in assessing the possibilities of relieving starvation by increased meat production—it is simply too inefficient and hence too expensive to be of value. The livestock of the world, including horses, dairy cattle, and even dogs can only stand as insurance against a short-term hunger crisis. By eating the corn, fed to hogs, instead of the pork itself, can much of the loss in providing food be eliminated. In many parts of the world this expediency has already taken place as a necessity. Microbial or synthetic food, however, appears to be the only possible solution to the food crisis that faces the world.

This invention consists of a process for the utilization of biodegradable wastes and inexpensive organic and inorganic materials by converting them into valuable products such as food and fodder, or food and fodder supplements, organic acids, certain non-toxic acids and other organic and inorganic byproducts. Microbial food for human consumption can be nutritive, inexpensive, and provide a balanced diet. There are problems in making the food palatable and in convincing people of its desirability. There are also problems in the technology of producing the food inexpensively.

Whereas garbage and other solid wastes find very limited use in landfill, they are generally regarded as undesirable wastes, that ought to be incinerated. In addition to cellulose, other materials are to be found in wastes. While glass and metal can be extracted by mechanical means, lignin, which occurs in varying quantities in the solid wastes generally would have to be extracted chemically, because its presence inhibits the growth of other microorganisms. In the wastes of the paper industry, the lignin content generally is very high; in garbage it is neglibily low. A high percentage of the content in both garbage and sewage is biodegradable and can serve as energy sources for microorganisms. Cellulose is probably the most common single organic compound found on earth today, even discounting the huge quantities of hydrocarbons, of lignin found in soil, and of peat, and coil. In the United States solid wastes are presently 200 million tons annually, and by 1980 are expected to rise to 300 million tons. A very large quantity of these solid wastes consists of cellulose and other biodegradable materials.

This invention is in a method for the utilization of biodegradable waste material comprising (a) forming an aqueous suspension of comminuted biodegradable waste materials mixed with a microbiological system of a plurality of several types of microorganisms including cellulolytic microorganisms; (b) maintaining the suspension in a fermentation tank under conditions for microbial metabolic action to decompose the carbohydrates, fats, cellulose in suspension; (c) removing from the tank, during and after the metabolic action the gaseous products of the metabolic action and the portion of the suspension resistant to microbial actions; (d) separating the solid proteineous material in the suspension after the metabolic action from the liquor of the suspension, and (e) extracting the liquid components from the liquor by electrodialysis. In accordance with features of the invention, a microbiological system of several types of microorganisms is used for the efficient conversion of specific varieties of different biodegradable waste substrates. A beneficial action of the microorganisms is established for the protection of the ferment or the entire microbiological system for the deleterious effects of phage or other harmful agents. The product produced by microbial action are separated in accordance to one embodiment of the invention by means of electrodialysis, or dialysis, or electrolytic action. The substances are concentrated and purified. Flavors or supplemental food additives are mixed with the microbial product for animal or human consumption.

The invention is described with reference to the drawing, wherein.

Figure 1:
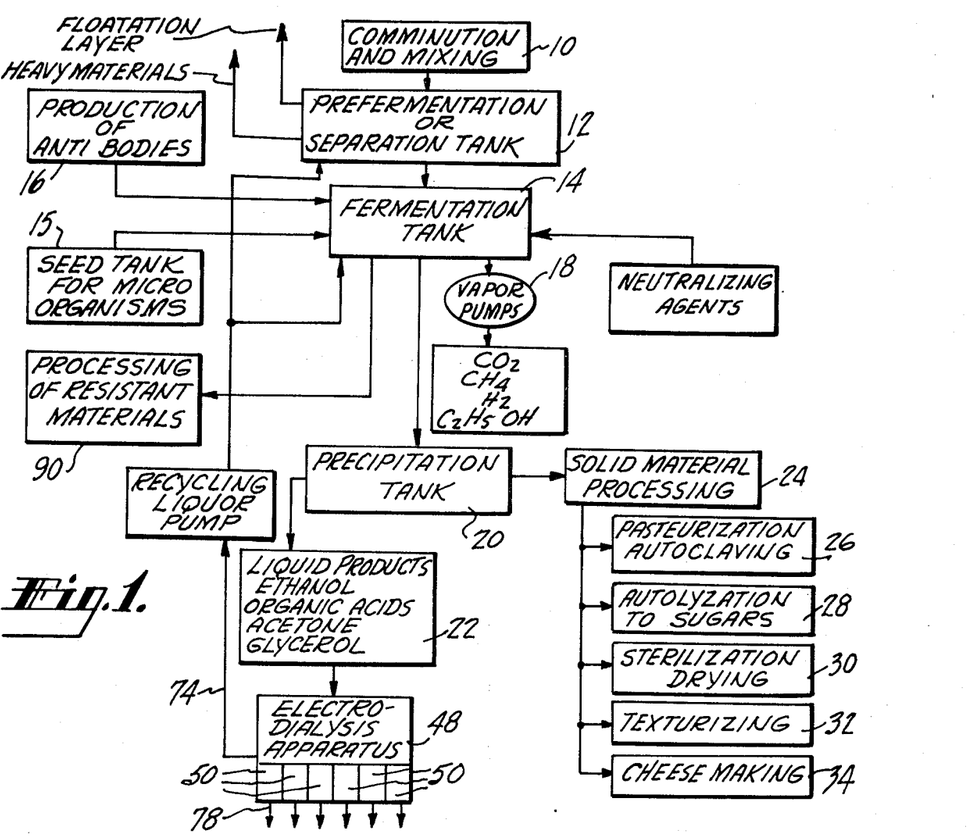
FIG. 1 is a flow chart indicating the several steps of the process, in accordance with embodiments of the invention.

With reference to FIG. 1, solid waste materials such as garbage, or trash of certain kinds is first comminuted by grinding or chopping until the material is thoroughly crushed, ground and mashed into fine particles. Water is added to the fine material into a tank 10 and the mixture stirred to provide uniform consistency. The amount of water added may vary from 25 percent to 99.6 percent by weight, depending on the manner in which the mixture is to be handled. The mix resulting from grinding and mixing with water is pumped into a prefermentation or separation tank 12. Here the different waste ingredients are separated, with the heavier materials, as metals and glass, settling to the bottom of the tank and with the lighter materials, such as oils, greases, fats, plastics, wood etc., floating to the surface and providing a floating layer. The mix in the separation tank 12 is gently agitated to aid in the material separation. The heavier materials can be removed in any feasible manner and then separated from each other by known procedures, such as magnetically extracting the magnetic metals and separating glass and other such material by sedimentation. The floatation layer is drawn off and the fats, oils and greases separated from neutral materials and processed into soaps, glycerol and fatty acids by conventional processes.

The bulk of the finely comminuted waste material in the separating tank 12 remains in suspension. This material is essentially biodegradable and is mainly in the form of sugars, starches and other carbohydrates particularly cellulose and proteins. Fermentation of these materials begins in this tank 12, due to microbial metabolic action of bacteria naturally present. Oxygen is soon removed from the closed fermentation tank 12 by the natural growth of the aerobic bacteria which also present, and which thus protect the anerobes from exposure to oxygen. Specific examples of organisms for the removal of oxygen in the prefermentation tank include: *Bacillus subtilis, E. coli, Aerobacter aerogenes* and *Bacillus proteus vulgare.*

The suspension of waste materials is next pumped into a closed fermentation tank 14. Water may be added to the suspension to provide an optimum concentration for fermentation. Growth of microorganisms is generally most rapid when the water content of the system is high. Thus, 5 percent solid matter in the system would be about normal, but this percentage can be varied. The fermentation process is preferably one in which anaerobic bacteria act on the waste material. The bacterial growth is from bacteria already present in the waste material, when collected and prior to its comminution, as well as from the bacterial growth in the separation tank 12. At this time, additional anaerobic factors may be added to the suspension in tank 14 to speed up the fermentation action. These may be cultures of rumen microorganisms or a variety of thermophilic bacteria.

There are three main groups of cellylolytic microorganisms. The group which is selected to be employed in the fermentation or in the synthesis of microbial food will depend on the nature of the substrate, the size of the ferment, and the general physical conditions in the areas where fermentation is to take place. Rumen microorganisms are in general the most fastidious. While these are mesophilic microorganisms and can be cultured at moderate temperature (e.g., 35°–40° C.) they would generally need extra amino acids and organic materials to stimulate their growth.

A second group of cellulolytic microorganisms are thermophilic and should be grown at elevated temperatures. Thermophilic bacteria, included in this group, may be grown at temperatures as high as 70° C. These organisms may be grown whenever conditions are such that the ferment can economically be maintained at elevated temperatures. In no form of anaerobic fermentation is there a large heat production, the microbes are very efficient, so that unless the surroundings are warm or the ferment is very large and has proportionally a small surface area, some type of external source of heat may be necessary for thermophilic microorganisms.

A third group of microorganisms are capable of decomposing cellulose and lignin materials that are resistant to the decomposition by the other two groups These microorganisms are, in general molds or fungi, although some bacteria can act, in the same way. They include Polyporous versicolor, Stereum hirsutum, Trametes pini, Aspergillus terreus, Penicillium linaceum, Fomes pini, Boletus lepideus, Poria subacida, Lenzites sepiaria, and others. Slow, but effective, composting can be used with these microorganisms to increase the protein content in the material utilized. Because these microorganisms are slow and aerobic, a certain amount of air must be kept in contact with the microorganisms; but the amount of air available will generally not be the limiting facto in their growth. Yields of protein tend to be higher with these aerobic microorganisms than with their anaerobic counterparts, but there is no significant concomitant production of organic acids or alcohols.

Fermentation in the tank 14 is preferably an almost exclusively anaerobic process. The advantage of using anaerobic bacterial fermentation is that little heat is produced and the efficiency of the system is high. In addition, valuable by-products are produced, whereas carbon dioxide and water are the only significant products of aerobic microorganisms acting on the waste suspension. Very little heat is produced in anaerobic fermentation, and thus very little energy is lost as heat. For every pound of cellulose decomposed anaerobically 0.08 to 0.13 pounds of microbial food (dry weight) can be expected to be synthesized. For aerobic growth, the yields of microbial foods are greater, but the efficiency is considerably less. The explanation to this paradox lies in the fact that most of the energy originally contained in the cellulose remains tied up in organic compounds such as acetic acid, once the anaerobic fermentation is complete. For aerobic growth, there are no such energy-rich by-products.

Both thermophilic and mesophilic bacteria, mentioned above, are effective in the decomposition of a wide spectrum of organic compounds, in particular cellulose, which forms such a large fraction of the waste material used. Among the specific types of cellulolytic microorganisms that may be used are the following mesophilic rumen microorganisms; *Bacteriodes succinogenes, Ruminococcus flavefaciens, Cillobacterium cellulosolvens, Ruminococcus fibrisolvens,* and *Ruminococcus albus,* and various Clostridia.

The temperature of the substrate in tank 14 would probably lie between 30° and 80° centigrade. Although some bacteria are capable of carrying on fermentation at cooler temperatures, 10° C. would be the lower limit for the action. In addition to losing heat to the surroundings, the system would lose a considerable amount of thermal energy by the loss of gases and vapor. If the system were to small, so that heat losses to the surroundings would cause the temperature to drop below optimum levels, air can be added to the system in order that heat production increase and fermentation be maintained to optimum temperature levels. The temperature of the system would depend on the nature of the bacteria used for fermentation.

In the main fermentation tank 14, bacteria of the type listed act upon all the components in the mixture. An agitation system (not shown) is used to increase the efficiency of the fermentation and to increase the rate of the bacterial action. In addition to the types of anaerobic bacterial that act on the substrate, it would often be advantageous to include fungi, molds, and protozoa. If necessary, inorganic nutrients can be added to the tank 14 in dissolved or suspended form for use by the bacteria. The inorganic nutrients added would include ammonium compounds, phosphate, sulfate, potassium, magnesium, and calcium compounds. These nutrients can be supplied in a form such as processed sewage wastes.

Microorganisms including fungi, molds, and protozoa as well as bacteria used in the main fermentation process are by nature self-propagating. Because the ferment in tank 14 represents a continuous process, there will always be large quantities of seed microorganisms to reproduce, as new substrates are added to the ferment. When the composition of the ferment substrate changes due to seasonal changes (e.g., in the fall it would be expected that a higher percentage of the solid wastes of a community would consist of leaves) or other variations, it would be desirable, if not necessary to alter the composition of the microbial community in favor of those microorganisms that would grow most rapidly under the given conditions. At such times and at the initial innoculation of the fermentation, considerable care is necessary in adding cultures of microorganisms. Because some of the anaerobes such as the rumen microorganisms Ruminococcus and Succinomonas, are particularly sensitive to exposure to air, it may be necessary to saturate the ferment with carbon dioxide and to exclude oxygen. Another problem that arises stems from the fact that microorganisms take a certain time to adapt to a new environment. There is an initial period in which the microbial population may actually decline; if the density of microorganisms is below $10^4$ per cc, there is an appreciable chance that the microorganisms will become extinct before they can adapt to the new environment.

Protozoa, bacteria, and other microorganisms (yeasts, molds, fungi) from natural or laboratory sources, such as the rumen of a cow or cultures of soil, should be added initially to the fermentation vat 14. Alternately, they can be first grown in a small fermentation system 15, allowed to multiply in it or in progressively larger systems, and finally added as an innoculum to the main fermentation vat 14, when the population of the microorganisms is sufficient to insure their adaptation and survival. Because microorganisms vary greatly in their ability to adapt to new systems, population densities for particular strains of microorganisms ranging from 10 per cc. of ferment in the fermentation vat to 100,000 cc. may be considered to be a safe number. Because the innoculum used would normally contain up to $10^{10}$ microorganisms and at least $10^5$ of any one type, one part of the innoculum to a thousand parts of ferment would normally be quite sufficient, provided oxygen does not come into contact with the microorganisms.

Partially aerobic conditions in tank 14, may be desirable for the fixation of nitrogen. The latter, present in air is turned into amino acids, and eventually protein, by the rumen microorganisms that are present in the system. However, the fixation of nitrogen by bacteria is a very inefficient process. Thus, it would be probably advantageous to use other nitrogen sources than air so that the bacteria have enough of this essential element. Certain species of Clostridia and Azotobacter are capable of fixing atmospheric nitrogen. Their efficiency, however, is low. Where other source of nitrogen are too expensive, these bacteria may be used to take nitrogen from the air. For example, air may be blown through the prefermentation tank 12, where much of the oxygen would be removed before passing into the main fermentation tank. Bacteria there would absorb gaseous nitrogen and convert it into protein. The addition of urea, ammonium salts, nitrates, nitrites, and organic matter can be the sources of nitrogen for the microorganisms.

The use of more than one strain of bacteria in the fermentation tank 14, indeed the use of many species, has a tremendous advantage. Not only can the different types of bacteria or microorganisms digest specific parts of the available nutrient, but they do this more efficiently if each has a specific purpose. NOt all the bacteria would be cellulolytic, not all could digest protein with facility, and so on. So long as there is a wide variety of strains, species, and general availability, the microbial community will stabilize according to the physical conditions and the nature of the substrate.

Because the conditions present in the fermentation tanks are not suitable for the growth of the few pathogenic bacteria present, the latter would succumb to the competition of the types of microbes that are suited for life in the system. The presence of protozoa would have a beneficial effect. Protozoa would eat the pathogenic bacteria indiscriminately and only those bacteria that reproduce rapidly in the medium would survive. Being self-propagating the protozoa would have to be added only once to the fermentation tank. Thus, the pathogens would soon be engulfed by the protozoa, since the former are unable to reproduce rapidly outside of their optimum media. Representative rumen protozoa include: *Entodinium, Dasytricha* and *Diplodinium protozoa*.

In accordance with another feature of this invention, one method of insuring the growth of the proper bacteria only, lies in the ability of microorganisms to immunize themselves against a wide range of antibiotics. By exposing the desirable bacteria to certain antibiotics such as tetracyclines they will soon acquire an innunity to it by means of selective evolution and mutation. Unwanted bacteria that are introduced with the addition of new waste products and have not received such immunization treatment would remain vulnerable. It would then only be necessary to include one or more species of microorganisms in the system for the production of antibiotics, such as tetracycline. Whether this microorganism would be present in the main fermentation vats or would be produced in a smaller vat 16 using microbial food as a nutrient, is a matter of expediency. The latter situation would probably be superior because it would offer the greatest amount of control over the level of antibiotics and microorganisms. It would not be necessary to extract the antibiotic from the mold or other microorganisms, in which it is produced; the mold body itself consists of valuable protein, and there is no reason why this should not be recovered.

The process of fermentation in tank 14 generates large volumes of methane, hydrogen, and carbon dioxide as well as alcohol; the relative quantities of these gases depends on the nature of the substrate, the type of bacteria, the temperature, the degree of agitation in the system, and the presence or absence of relatively small quantities of "steering agents."

Because the temperature of the fermenting vat 14 will probably be close to 40°, the vapor carried off by the gases would contain relatively large fractions of the more volatile fermentation products. Thus, it would be desirable to condense this vapor.

The volatile products of fermentation can be removed by pumps 18 connected to compressors, which liquify first the vapor, then the carbon dioxide, leaving the methane and hydrogen in gaseous form. The condensed vapor, which would have a high alcoholic content, could be used as a source of industrial alcohol, or directly as a variety of an alcoholic beverage, with or without appropriate flavoring. If desirable, the methane and hydrogen could be used on the premises as a fuel for heat, motion, or electricity, or they may be sold as byproducts of the operation. Fuel cells could conveniently convert their energy directly into electricity.

The use of steering agents in the process is supplementary. Such agents, however, can be extremely useful in controlling the yield and types of products formed by the microorganisms. For example, because lactic acid produced by bacterial action is valued at more than twice the price of the acetic acid produced, it obviously is desirable to have a high lactic to acetic acid ratio. The halogen derivatives of acetic acid, can have an inhibitory effect on acetic acid production by bacteria. Also, it is possible to use such an antibiotic as penicillin, produced by molds in the system for minimal cost, to inhibit only the growth of strains of bacteria that naturally produce acetic acid as a main product. The net effect of such inhibition would favor the alternative metabolism of other bacteria that produce lactic acid.

Also, because methane production accounts for considerable losses of available energy, it may be desirable to limit production of this gas. Small quantities of carbon tetrachloride have definite inhibitory effects on methane production by rumen microorganisms. Present in concentrations of less than one in a thousand, carbon tetrachloride can virtually eliminate production of methane without serious effects on the growth rate or other aspects of the metabolisms of the microorganisms. This effect can only be explained by assuming that the presence of this compound interferes with the action of one or more enzymes involved in the formation of methane. The carbon tetrachloride is not used up, and its expense would be minimal.

The process of bacteria fermentation in tank 14 produces organic acids such as lactic, butyric, propionic, acetic, etc. by the bacteria mentioned above. Such acids are preferably neutralized, because, even at concentrations of the order of 0.1 percent by weight, organic acids in the fermentation system being to inhibit the growth of microorganisms, unless the mash is partially neutralized by some alkaline substance. Using sodium bicarbonate the concentration of organic acid ions can be increased by a factor of 10 without producing the corresponding inhibition that will take place, if the acids were not neutralized. The optimum pH level of the fermentation system is expected to be in the neighborhood of 5.5, thus, it is undesirable to neutralize the acids completely. When the pH falls below 5.0, however, the growth of most cellulolytic bacteria slows down. Using inexpensive alkalis such as sodium, magnesium, calcium, or ammonium carbonates, or hydroxides, one can maximize the concentration of organic acids in the ferment. Sodium, magnesium, and calcium acetates, lactates, butyrates, and propionates would be among the products formed in solution as a result of the neutralization. All of these compounds have utility in the chemical industry.

Since there is an inhibitory effect caused by a high concentration of calcium ions or other cations, the levels of these ions are never allowed to interfere with the growth of the microorganisms. Most of the microorganisms are sensitive to extremes in pH's. The pH must, in tank 14, therefore, be kept at moderate levels. In general, it would be desirable to maintain a slightly acid pH at 5.0± 2.0. If the acidity is much greater than this, the microorganisms would be inhibited, but this level would allow the minimum amount of alkaline neutralizing agent to be used.

The microorganisms employed in the fermentation process grow as they decompose the carbohydrates, fats, and proteins. The relative quantity of proteolytic enzymes and microbes present would best be small, and sources of nitrogen other than protein and amino acids should be present so that there would be a net increase in the amount of protein present in the system due to the synthesis of amino acids and protein by the microorganisms. Thus, whereas there would be considerable decomposition of the abundunt, energy-rich carbonhydrates, especially cellulose, much of the protein originally present would remain untouched, though now separated from the encrusting matter previously present.

Because of the small size of most of bacteria employed in the fermentation process they easily remain in suspension in tank 14, but the larger and more fibrous particles of cellulose and comminuted material tend to sink to the bottom. Because of this tendency, it is necessary to employ some system of mechanical agitation. After a period of time, in the order of 60 hours, fermentation and cellular conversion has taken place, so that a liquid suspension or liquor is withdrawn from the upper portions of the tank 14 into a precipitation tank 20. When the liquid suspension is withdrawn, however, it is desirable to leave the unfermented portions behind in the tank for further action by bacteria. The liquor is substantially free of crude fiber, lignin, and other indigestible materials originally present in the waste material. A high proportion of the liquor consists of fermentation waste products including ethanol, organic acids, and possibly such compounds as acetone and glycerol. In addition, there is a substantial quantity of suspended matter which contains more than 65 percent protein (dry weight) in the form of viable bacteria, dead bacteria, and plant protein. A certain amount of amino acids would also be found in the solution. Because of the high moisture content of this liquid, it would be undesirable to dry it directly to obtain the valuable nonaqueous components. Whereas the liquid may be centrifuged in order to obtain the solid components, centrifugation would normally be prohibitively expensive. Instead of direct centrifugation, a chemical coagulant could be added to the system. A chloride, or a sulfate, or another salt of aluminum or iron may be added to the system in order to precipitate the bacteria and other suspended matter. The quantity necessary to precipitate the suspended matter in the system is small, ranging from 0.0001 to 1.0 percent by weight. When used in conjunction with a centrifuge, the chemical coagulant is very effective; it would shorten the necessary centrifuging time to a fraction of the time otherwise necessary.

When the liquid suspension is treated with these precipitants and/or centrifuged, the supernatant liquid will have picked up a small quantity of iron or aluminum salts. This should not have any serious effect on the properties of the resulting liquid. An alternative method of concentrating the solid components of the mixture is by means of filtration, using a ceramic, membranous, or fibrous filter.

Due to the dipoles present in amino acids and for other more complicated reasons, proteins and bacteria cells can have net electric charges in aqueous solutions. Since like charges repel, the greater the net charge on the cell walls of bacteria, the less readily will the bacteria stick together or coagulate. The net electric charge for cells and proteins, however, depends on the pH value of the solution in which they are contained. At one point on the pH scale, called the isoelectric point, there is no net charge for the particular type of bacteria or protein involved; at this point coagulation would not be inhibited by repulsive forces. On one side of the isoelectric point the bacteria or protein develop a positive charge; on the other side a negative charge. The isoelectric point depends on the particular type of protein or on the molecular structure of cell wall. The further away the pH value is from the isoelectric point, the greater the magnitude of the net electric charge. In general bacteria have isoelectric points at acid pH levels; values of 2.0–3.0 are typical, and if the pH is fairly close to these values, coagulation is most rapid and efficient. The addition of a small amount of acid may facilitate coagulation.

Even after most of the particulate matter in the supernatant liquor is removed from the precipitation tank 20, the liquor pumped into tank 22 is far from pure; the low level of organic acids make it practically useless because of the large amount of energy and the equipment necessary for fractional distillation. The valuable components of the dilute solution are, therefore, extracted by means of the following process, in accordance with another feature of this invention.

Figure 2:
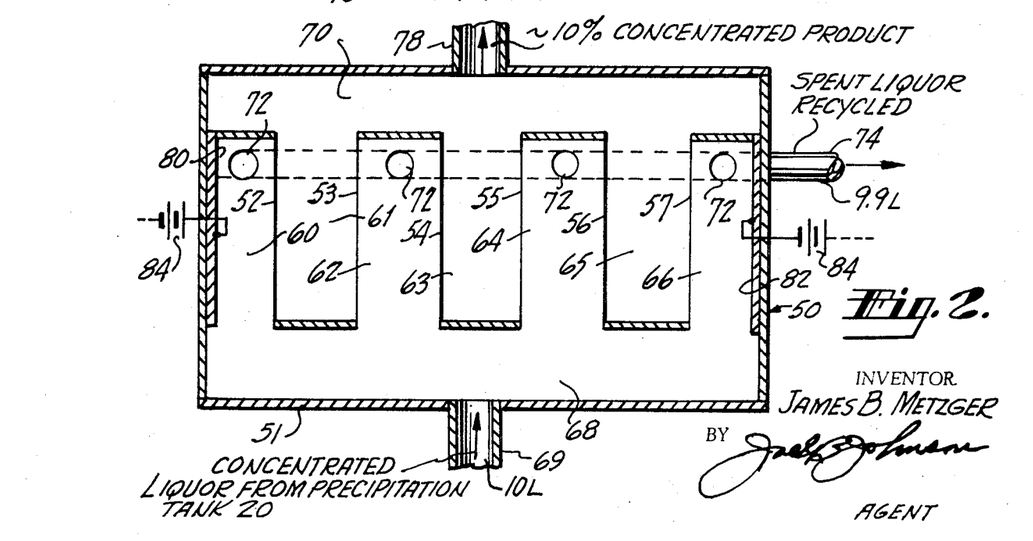
FIG. 2 is a schematic diagram showing a battery of cells used in dialysis separation of the products of fermentation in the process of FIG. 1.

The liquor is pumped or otherwise allowed to go from the collection tank 22 through one of several multi-celled electrodialysis batteries 50 of an electrodialysis apparatus 48. FIG. 2 discloses the details of one battery 50 in which one of the organic acids in the liquor can be concentrated and removed.

Electrodialysis is the process by which the relative concentrations of certain solutes in water solutions may be increased on one side of a membrane. In this invention, the utility of electrodialysis lies in its efficiency in the separation and concentration of the components in the fermented liquor. As mentioned above, the liquor components include organic acids such as acetic, lactic, propionic, butyric, etc. as well as acetone, glycerol, ethanol, and amino acid. The electrodialysis apparatus 48 consists of several batteries 50 of electrodialysis cells. Each battery can consist of cells formed by separating membranes, alternate ones of which have the same selectivity, such that each battery is operative for the ceoncentration of a particular component of the liquor.

Each battery 50 consists of a tank 51, which is separated into cells 60–66 by parallel diaphragms or membranes 52–57. An inlet chamber 68 opens directly into cells 60, 62, 64, and 66, while cells 61, 63, and 65 are closed off from the inlet chamber 68. Cells 61, 63, and 65 open directly into an outlet chamber 70, which is closed off from the cells 60, 62, 64, and 66.

Concentrated liquor is pumped from the collection tank 22 through an inlet pipe 69 into the chamber 68 and into cells 60, 62, 64 and 66. The liquor is circulated by being drawn off through openings 72 leading from the bottom of cells 60, 62, 64 and 66 into an outlet pipe 74. Initially cells 61, 63 and 65 and outlet chamber 70 are filled with concentrated liquor from the tank 22. The product of the electrodialysis flows from the outlet chamber 70 from cells 61, 63 and 65 and through the outlet pipe 78. Within the tank 51 on opposite sides are mounted electrode plates 80 and 82, respectively. Plates 80 and 82 are connected in series with the positive and negative terminals of a source of d.c. potential 84, with the circuit being completed through the cells 60–66 of the electrodialysis battery 50. The positive plate electrode 80 attracts anions in its direction and the negative plate electrode 82 attracts cations in its direction. Between the electrode plates are arranged the ion-selective membranes 52–57. Membranes 52, 54, and 56 are treated in the manner described below to the selective with respect to cations. They permit the free passage of such ions, as positive sodium and hydronium ions, for example, but these same membranes inhibit the passage of anions, including acetate, propionate, and lactate ions. Membranes 53, 55, and 57 are normally not treated and allow the passage of most ions in the liquor solution.

In operation, the electrodialysis tank 51 is filled with the concentrated liquor. If the battery 50 is for the separation of acetic acid from the liquor, then membranes 52, 52 and 56 are treated freely to permit the passage of all ions but acetate ions. Membranes 53, 55 and 57 are normally untreated, and as mentioned above permit the passage of all ions found in the liquor solution. When a potential difference of a few volts is applied between the electrodes 80 and 83, a migration of ions takes place. The concentration of the acetate ions tends to increase in cells 61, 63 and 65 as the concentrations of these ions decrease in cells 60, 62, 64 and 66. Sodium and other cations drift through all the cells toward the negative plate 82. The liquid is slowly pumped out of the chamber 70 through the outlet 78. The rate of removal of the liquid is such that due to he electrodialysis action the concentration of acetic acid in cells 61, 63 and 65 is about 10 percent by weight. The liquid in these cells is continuously replaced by osmosis through the membranes tending to equalize the concentrations of the solutions in all the cells. Osmosis represents a secondary process, being slower than electrodialysis at reasonable current densities. For maximum efficiency, the membranes are placed very close together perhaps in the order of one millimeter apart. The liquor in cells 60, 62, 64 and 66 is replenished by a circulating system which draws the spent liquor from cells 60, 62, 64 and 66 through the outlet 74 and recycles the liquid back to tank 12 and 14.

Whereas membranes would be selected for a combination of desirable characteristics including conductivity, permeability, degree of selectively, length of life, and cost, several types of membranes are capable of giving good results. Various types of membranes are known. Some of these membranes are selective to the passage of anions (negative ions) or cations (positive ions). For example, membranes treated by precipitating barium sulfate within the membrane itself have the property that neither sulfate nor barium ions will pass through the membrane as readily as other cations or anions. The theory behind this sort of selectivity is that, since the membrane is saturated with sulfate and barium ions (in this particular case), and because like charges and like ions repel, barium and sulfate ions cannot pass through the membrane as readily as chloride, sodium, potassium, or other ions.

The same principle is applied in this invention, but with regard to organic rather than inorganic ions. Although existing anion-selective and cation-selective membranes would be effective in separating and concentrating organic acids in an electrodialysis apparatus, a special type of membrane, in accordance with this invention is both efficient and cheap to produce. These membranes consist of treated cellulosic materials—parchment, or Kraft paper, or Cellophane, or other membranes, which are derivatives of cellulose. Cellulose forms esters with various acids, resulting in compounds as cellulose acetate and cellulose propionate. It appears that the presence of even small quantities of the acetate or propionate groups in the membrane have an effect analogous to the presence of a sulfate group in a barium sulfate precipitation membrane.

An effective way of combining cellulose with acetate or propionate groups, consists in heating acetic acid anhydride or propionic acid anhydride with cellulose, optionally in the presence of sulfuric acid or glacial acetic acid or pure propionic acid. Under these circumstances, the organic acid anhydride combines with the cellulose to form a cellulosic ester of the organic acid. A similar reaction occurs, but with the concomitant formation of water, when acetic acid or propionic acid react with cellulose in the presence of sulfuric or phosphoric acids, which act as dehydrating agents. Because a membrane consisting of pure cellulose triacetate is a poor conductor of electricity in an aqueous system, it is impractical. However, in accordance with this invention, I have found that a cellulosic membrane when soaked in glacial acetic acid at room temperature for about 12 hours and is washed in clear water, it becomes selective with respect to acetate ions. That is, acetate ions do not pass as readily through the membrane, so treated, as do hydrogen, sodium, or other ions. The electrical conductivity of a so treated cellulosic membrane is excellent. If the membranes are treated more drastically, for example with the organic acid anhydride, but not for so long that complete esterification takes place, the membrane becomes more highly selective towards the passage of the ions without prohibitively decreasing the conductivity of the membrane.

This new type of membrane has special utility in the electrodialysis process for this invention. Because the liquor contains several organic acids, a membrane selective not only to cations, but also to particular cations serves as an effective means of separating and concentrating one acid from another. By using several electrodialysis units, one unit for each type of organic acid that is to be separated, and each type with the appropriate variety of selective membranes, it is possible to obtain good concentrations and purities of the individual acids.

The liquid in the collection tank 22 is flowed through the batteries 50 of the electrodialysis apparatus, as described. With an organic acid content in the order of 1 percent, this liquid is a good conductor of electricity, especially if the ions of an alkali metal (such as sodium or potassium) are present. Electrodialysis is most efficient, if the difference in concentration of the liquids on either side of the membranes is low. Thus, it is cheaper to extract 1 part of 10 percent acetic acid by electrodialyzing 20 parts of 1 percent acetic acid and reducing the concentration of these 20 parts to approximately 0.5 percent, than it is to extract the 1 part 10 percent acetic acid from 10 parts of 1 percent liquor, which would reduce the acetic acid concentration of these 10 parts to zero. Electrodialysis by successive batteries of units is more efficient. For example, a 1 percent liquor could produce a 4 percent product in one electrodialysis unit, and this 4 percent solution could be further concentrated to 12 percent in a second electrodialysis unit. Such multi-step concentration is more efficient (because the effect of osmosis are minimized), and the product would be purer. Organic salts can also be concentrated and separated from the liquor by the electrodialysis apparatus disclosed in FIG. 2. For example, membranes 53, 55, and 57 can be treated to be completely discriminating to sodium ions, so that sodium acetate becomes concentrated in cells 61, 63 and 65. The concentrated salt solution is then removed and dried to obtain the salt.

Taking a portion of the organic acids or salts from a large quantity of liquor from tank 22 is more efficient than taking an equal quantity of organic acids from a smaller quantity of liquor. Because the liquor from which the portion of organic acids has been extracted is recycled back into the fermentation tanks 12 and 14, there is no loss using large quantities of liquor for feeding the electrodialysis apparatus. The primary problem encountered in using increasingly large quantities of liquor lies in the probability of dissolving oxygen in the liquor. Large quantities of oxygen in the recycled liquor could have a deleterious effect on the anaerobic fermentation in the tanks 12 and 14. To avoid such an effect, the spent electrodialyzed liquor is best recycled into the prefermentation tank 12, where aerobic bacteria would use up the oxygen before it could harm the anaerobic bacteria of the main fermentation tank 14. Under certain circumstances, it might be advisable to allow the effluent to age in a reservoir before returning it to the fermentation tanks 12 and 14, because the fresh electrodialysis effluent may contain some oxidants and, thus, have an inhibitory effect on the microorganisms.

Because the electrical resistance of the aqueous organic acid solutions plays an important role in determining the efficiency of electrodialysis, it is desirable to minimize resistance. Since a spacing of 1 centimeter would have 10 times the resistance of 1 millimeter for a given cross-section in an electrodialysis apparatus, it follows that the closer the membranes are spaced, the greater the efficiency (in terms of power used to concentrate product). Thus, even in a large scale operation, the spacing between the membranes would best be small, in the order of 1 millimeter. The actual spacing would represent a compromise between the most efficient close spacing and most inexpensively produced electrodialysis units. In areas where electricity is cheaper, efficiency in the use of electric power would represent a less important consideration and membranes may be spaced more widely apart, if it is cheaper to build them that way.

The following aspects in the electrodialysis process make it effective and desirable. In dilute solutions, the proportion of organic acid ions to non-ionized molecules is relatively high. Thus, the conductivity of the dilute liquor is fairly good. Although the conductivity of the concentrated solution remains good, the proportion of the ions decreases and, thus, does not interfere with the process as would a high concentration of ions.

Amino acids contained in the liquor do not pass readily through any type of selective membrane, and therefore, are returned to the fermentation tank 12 and 14 with the spent liquor. There is no contamination of the purified, concentrated product with the raw liquor, because there is no direct contact between the two liquids.

Care should be taken so that the organic acid anions are the principle anions in the electrodialysis system; otherwise the concentrated product pumped off might have an undue amount of sulfate, chloride, or phosphate ions. This is accomplished by merely controlling the intake of inorganic ions into the original fermentation system.

The concentrated product pumped off need not contain any of the impurities of the original liquor. The product is comparable to distilled vinegar and could be used as a food, or it could be further concentrated by conventional means such as distillation, rectification, or evaporation.

Alternatively, the liquor from the fermentation suspension in tank 14 could be concentrated by evaporation, or it could be used as the basis of the tart, refreshing drink and food additive. It must be remembered that the liquor would contain varying amounts of alcohol and organic acids according to fermentation conditions. Thus, it would be comparatively easy to produce a beverage of low to moderate alcoholic content and containing a certain quantity of organic acids and carbon dioxide to give it flavor. Again, it would be necessary to sterilize any drink for human consumption with heat. The liquor in tank 14 could also be distilled in order to produce industrial alcohol or cheap distilled spirits. In no case would it be necessary to remove the fermentation products and by-products from the liquor completely; any portion of the liquor can be recycled in the fermentation vats. Through the use of steering agents, the composition of the liquor could be controlled further; the extractive methods would be used according to the composition of the liquor.

Excess heat produced by the electrodialysis apparatus could be used, if it is found expedient, as a "­free" heat supply for the fermentation vessel. The electrodialysis apparatus works at maximum efficiency when a large, constant flow of liquor goes through the system.

Although the salts of the organic acids formed as a result of neutralization are valuable, and they may be concentrated by the process of electrodialysis described, the acids themselves may be more valuable. By using membranes in the electrodialysis apparatus that favor the passage of hydrogen ions to alkali metal ions such as sodium, the concentrated product will be more highly acidic, and it will contain only small quantities of the alkali metal ions. The remaining solution will become quite alkaline and may well be recycled to the fermentation tank 14 to neutralize more organic acids that have been produced as fermentation proceeds.

In accordance with a feature of the invention, the system is organized to provide an equilibrium condition in the fermentation tank 14, depending on (1) the nature and concentration of the substrate, (2) the type of bacteria employed, (3) the presence of steering agents, if any, (4) the rate at which the electrodialysis apparatus withdraws organic acids from the system and (5) the pH of the liquid ferment, which is dependent on the concentration of alkali metal ions.

If the concentration of organic acid ions in the ferment is lowered by the flow of the liquid suspension from the prefermentation tank 12 into tank 14, for example, then the growth of microorganisism will increase and their metabolites, such as organic acids, whose production is a function of their growth rates will also increase. This tends to restore the ionic concentration in tank 14. However, at lower ionic concentrations, the efficiency of the electrodialysis apparatus is seriously reduced and less organic acids are withdrawn in a given amount of time or for a given amount of electric power, also tending to restore the equilibrium condition.

On the other hand, if the concentration of organic acid ions tends to increase, there is an inhibiting effect upon the growth of bacteria. This may occur at pH 5.0 or lower. Neutralization of the ferment by alkaline salts is then used to prevent the pH from dropping below 5.0. But again, conditions will be reached where the concentration of organic ions reaches about 1 percent, by weight. This condition also inhibits bacterial growth. This condition is balanced since the increased ionic concentration results in a greater conductivity of the solution entering the electrodialysis apparatus, which is reflected in the increased efficiency of the electrodialysis and the more rapid removal of the organic acids, until the point of equilibrium is reestablished. In practice only small fluctuations from the equilibrium concentration will occur unless any of the five factors enumerated above are altered. In that case the equilibrium condition will shift.

The concentration of organic acids at equilibrium would lie between 0.1 and 10 percent. At concentrations of less than 0.1 percent, the size of the fermentation tank and the extra expense in electrodialysis (to make up for reduced efficiency) would become economically prohibitive. Even the hardiest microorganisms would find it difficult to grow, if not even to survive, in a liquid containing more than 10 percent (calculated by weight) of organic acids, even if they were neutralized with alkalies. The optimum concentration represents an economic problem, as well as a scientific one. The cost of electricity and of alkalies, the prices of organic acid products and other factors enter into play.

If organic salt solutions formed as a result of neutralizing the acids with alkalies are withdrawn by the dialysis apparatus, the concentration solutions of these salts may be dried or cooled, so that the pure crystals of the compounds separate out. In the case of calcium lactate, for example, crystallization is quite practical. This salt is sparingly soluble in water and will crystallize at low concentrations with a neglible contamination by other compounds.

Organic alcohols and organic acids are produced by microorganisms and are part of the liquor taken from tank 14. Electrodialysis removes the organic acids, as described, but the concentration of alcohols and acetone would tend to build up. These energy-rich compounds—the alcohols including primarily ethanol and butanol—may be removed from the liquor by providing a mixture of gasoline and the liquor. Though gasoline (or other hydrocarbon mixtures) is immiscible with water, the alcohol and acetone will dissolve in the gasoline. In accordance to an embodiment of this invention, the liquor containing mainly water and some alcohol is mixed vigorously with gasoline. A considerable fraction of the alcohol will pass into the gasoline mixture, increasing substantially the volume of the gasoline portion of the system. After thorough mixing, an equilibrium is established so that no more alcohol can pass out of the water medium into the gasoline, and the ratio of the concentration of alcohol in the water to the concentration of alcohol in the gasoline is fixed. For ethanol I have found this ratio to be approximately 7:1, that is, for one volume of aqueous alcohol, there will be seven times as much alcohol as in one volume of gasoline mixture. For higher alcohols, such as butanol, and for acetone, the ratio of concentrations is more advantageous, allowing a greater amount of alcohols to be extracted for a given volume of gasoline used to extract them. In any case, the mixture is then allowed to settle, the gasoline-alcohol layer rising to the top, and the aqueous liquor sinking to the bottom of the vessel. These two liquids are separate and distinct and can easily be withdrawn separately. The gasoline mixture is withdrawn and may be used directly as a motor fuel. Gasoline containing such small quantities of alcohol dissolved in it has superior properties as a motor fuel, and the quantity of the fuel is increased by the inclusion of the alcohol.

The aqueous liquor, from which only a part of the alcohol has been removed by this process can be recycled to the fermentation tanks 12 and 14. The net effect of removing alcohol and acetone from the liquor in this manner is to remove all of the alcohol without waste and to enrich large quantities of gasoline by doing so. By lowering the temperature of the extraction below 32°F. ice crystals will form, and substantially more of the alcohol in a given batch will pass into the gasoline phase of the system. By a continuous recycling of the liquor virtually all of the alcohol is removed, eventually and the reduction in the concentration of the alcohol in the liquor has a beneficial effect on the growth of the microorganisms in the main fermentation tank 14.

Once the solid, proteinaceous material is separated, it can be processed by equipment 26 in several ways. It may be pasteurized, autoclaved, deodorized, and flavored, to become a high nutritious beverage, outranking even milk. It may be used as the basis or as a supplement for any one of a wide variety of foods or fodder, including soups, breads, and meal. It may be autolyzed with equipment 28 to release flavors by the addition of proteolytic enzymes at set pH and temperature. The enzymes already present may be used to convert any starch or cellulose present, or added to it, into sugars. This would be achieved by selective destruction and inhibition of enzymes such as those involved in glycolysis that normally would convert the sugar into acids and alcohol. Thus the product could acquire a sweet taste. Autolysis is the process that occurs when the proteolytic enzymes of a cell found in the lysosomes are released and bring about the self-digestion of the cell. Autolysis may be brought about by a process that disrupts the lysosomes, so that the enzymes contained in them attack the protein of the cell. Heat, grinding, addition of other proteolytic enzymes, or hydrolysis with hot mineral acid may bring about autolysis. The amino acids and polypeptides formed from the proteins as a result of lysis tend to be more flavorful than the proteins themselves. Boullion cubes and instant gravy often have hydrolyzed vegetable protein. Lysis causes a similar hydrolysis of the proteins of cells.

Degradation of certain proteins would be advantageous in this process, if the protein were otherwise resistant to digestion. The protein found in compost is of this type. By boiling with a dilute solution (0.5%) of mineral acid (sulfuric or hydrochloric) hydrolysis will occur, and autolysis may supplement the effect of the acid. Proteinaceous material treated in such a manner for about 30 minutes would be easy to digest for an animal, a human, of another microorganism. Autolysis may also be induced by means of electrohydraulic shock provided by a high potential between plates, alternated from positive to negative at a high frequency. The bacteria lying between the plates in the field of the alternating potential are so jostled that their lysosomes are disrupted, and the enzymes released proceed to digest the cell.

Also, the semi-solid proteinaceous material may be sterilized and dried in a sterilizer and oven 30 to a stable powder form, similar to fish meal. It must be noted that a relatively high temperature should be employed in order to make the bacterial food safe for consumption. Because of the difficulties of controlling the bacteria cultures, it is possible although unlikely, that some pathogenic bacteria may be present. These should be killed, and they are often resistant to mere boiling. Autoclaving the liquid or dry powder will insure not only the sterility of the product, but it should also destroy any toxins present that may have been formed by the action of bacteria, fungi, or molds. For example, heat will inactivate the entertoxin of *Clostridium botulinum*, which otherwise would pose a severe threat to any consumer of the food.

The vitamin content of the bacterial food is very high, especially the B-vitamin content. So long as the autoclaving temperature does not go above 260°F., there will be minimal decomposition of vitamins; thus, controlled autoclaving would not impair the nutritional value of the product.

In order to make the semi-solid microorganism coagulant palatable, one or more of three general methods could be employed. When it or a product prepared from it is fed to animals, taste is not the primary consideration. For human consumption it could, however, be flavored in order to cover up any objectionable taste. Hot spices would be especially effective to accomplish this feat. The flavors and odors already present could be weakened or taken away altogether by means of chemical treatment. The use of alkalies to neutralize amino acids and other flavor and odor-causing substances will reduce the level of both flavor and odor so that the product is quite bland. Heating and drying are also effective. Under certain circumstances, it may be desirable to bring out the flavor of the material. This is accomplished by the addition of enzymes and/or autolyzing.

The proteinaceous solid material from the precipitation tank 20 may also be texturized to simulate meat, in accordance with a feature of this invention, by appropriate equipment 32. First, the protein is purified by dissolving the proteinaceous material in alkali, acid, alcoholic, urea, or biuret solutions. In this process the alcohols produced by fermentation in tank 14 may be concentrated and used as solvents for the protein. Strong alkalies (e.g., sodium hydroxide) and strong acids (e.g., sulfuric acid) are also effective solvents for protein. In order to texturize the protein to simulate meat, it is essential that protein fibers are formed. A concentrated protein solution, in one of the solvents mentioned above, is forced under pressure through the tiny holes of a spinneret. On the other side of the spinneret is a solution and environment in which the protein is considerably less soluble. In pure cold water the protein would immediately coagulate into fibers, and these fibers being insoluble are easily extracted and washed. The protein fibers may be formed into a synthetic meat by binding them together with gelatin or a similar proteineous material.

If hot sulfuric acid or hot sodium hydroxide is used to dissolve the protein, the solution is forced through the spinnerets and the acid or alkali is immediately diluted. By means of concentrative electrodialysis the acid or alkali may be reused. In the case of sodium hydroxide, the dilute solution may find utility as a neutralizing agent for the main fermentation system, as described above. Although electrodiaylsis could hardly be employed as a recovery technique for alcohols, urea, or biuret, these agents could also be used. The dilute solution of urea or biuret could be added to the fermentation process, in which it would be used up as a highly beneficial source of nitrogen.

Another edible product that can be derived from the described process is synthetic cheese. In place of milk curds, as the basis of this cheese, the semi-solid precipitated proteinaceous material from the tank 20 is placed in a vat 34. Precisely the same strain of bacteria or mold is added to this nutrient, as would be added to cure the corresponding cheese. Growth of the microorganism is rapid. The microbial nutrient is superior to milk in this respect. Flavoring agents such as propionic and lactic acids can be added to the system so as to approximate the flavor of the cheese. Fats and oils may be added, also in order to duplicate the composition of the natural cheese.

To give the cheese the right consistency and body, it would be necessary to add a truly curdled proteinaceous material (even a small amount of milk protein will do) or to add a material consisting of a polysaccharide or derivative thereof. Starch and derivatives of cellulose are suitable for the latter. A sodium salt of carboxymethylcellulose would be highly suitable. While it would provide no nutritive value to human beings, its presence would add bulk to the diet, and its concentration would be low.

One of the major problems that has existed in the past as a deterrent to the utilization of microorganisms for decomposing garbage and such materials was the large quantity of noxious wastes after bacterial fermentation and the costs involved in disposing of this apparently useless material. After the main fermentation process for garbage, the mass of the solid material remaining would be considerably reduced, but virtually all of the mineral or inorganic material originally present (if not previously withdrawn by mechanical means) would remain. In addition, substantially all of the lignin, a considerable fraction of the cellulose and protein, which would be found in the dead bodies of the microorganisms would be mixed in with the inorganic material.

Although most of the organic material present in the main fermentation tank 14, should in time decompose, a substantial portion of it is quite resistant to microbial decomposition. The build-up of such resistant material may actually serve as a mechanical or even chemical block of the fermentation of the parts that can otherwise easily be decomposed. Because of this inhibitory effect, it is desirable to flush away the resistant material causing the decrease in the fermentation rate.

The resistant material would be largely composed of lignin, resistant varieties of cellulose and hemicellulose, other resistant organic compounds, and non-degradable material. The material would tend to sink to the bottom of the tank. By means of a flushing system, these may be removed without disturbing the rest of the system. It must be noted that the waste material contains substantial quantities of protein, and this should not be wasted. The protein consists in three categories; protein of bacterial or other microbial cells that were mechanically attached to the waste, a type of protein resistant to attack and any other proteins including residual protein from the original waste material. In order to extract this resistant material, treatment with strong acid or alkali, dissolving in an organic solvent such as isopropyl or butyl alcohol, or treatment with proteolytic enzymes or microorganism is applied in the apparatus 90.

One method, which is effective consists of treating the material with a solution of sodium hydroxide in order to release proteinaceous material into solution or suspension. This is followed by neutralization and precipitation of the proteinaceous material using centrifugation or chemical coagulation. This is, of course, followed by drying, autoclaving, or other processing to make the material suitable for consumption.

Another method includes electrodialysis or dialysis. Since the lignin, most of the resistant cellulose and the resistant materials, other than proteins, are not dissolved by the process of boiling in solutions of acids or alkalies, the liquid containing the protein is thus easily withdrawn. Then, by means of electrodialysis or dialysis the protein and hydrolyzed protein may be separated from the acid or alkali. In electrodialysis the acid or alkali is concentrated on one side of the membrane, while the protein is precipitated on the other side. Electrodialysis has the advantage of recovery of the acid or alkali, since the acid or alkali passes to the other side of the membrane leaving the protein and amino acids behind. Dialysis depends on a difference in the concentration of the two solutions on either side of the membrane. If the acid or alkali were merely neutralized rather than separated from the protein, only a portion of the protein would precipitate, and the salt concentration of the broth would be high.

Protein comprises up to 20 percent of the solid waste of the main fermentation process. For every ton of raw garbage originally processed, about 200 pounds (dry weight) of resistant material would be produced after substantially all the free protein and directly utilizable substances are withdrawn. Because microorganisms—principally fungi—are so slow in attacking lignin, resistant, cellulose and hemicellulose, and because the products produced by the main fermentation process and are even harder to extract, strictly controlled growth of such microorganisms would be economically infeasible.

Instead of a controlled fermentation the material is placed in an open field and covered with soil. In a field of 1 acre the compost could be piled to a height of about 4 meters, and 20,000 tons of compost could undergo the comparatively slow process of decomposition. To enhance this natural process the compost is kept moist and aeriated, and ammonia, phosphate, calcium, potassium, and other inorganic nutrients should be added to the compost to replace the nutritive material already extracted in the form of protein. Aeriation can be achieved by a combination or any one of the following methods: the inclusion of earthworms or similar animals that thrive in compost, while stirring up the mixture and allowing contact with air; periodic bulldozing of the field to turn over the under layers; the compost could also be placed in layers that would not be compressed. Various strains and types of fungi including the groups classed as white and brown rots could be added to the compost. Because they are self-propagating, the addition of cultures to the compost would be necessary only once.

Under the conditions described a minimum of three months would be required for substantial degradation to take place in the compost. While the weight of the compost would be substantially reduced due to loss of carbon dioxide and water to the atmosphere, the absolute as well as percentage protein content in the compost would rise. Although such aged compost could serve as an excellent garden mulch comparable to peat moss, by the end of several months the protein content could rise to as much as 20 percent. This protein may then be extracted by the method described above. Derivatives of humic acids, cyclic organic compounds, and similar substances would also be found in the humus form. Potentially they could serve as a source of organic chemicals if they are extracted by means of conventional or destructive distillation.

A variation of the system of producing protein from carbohydrates consists in the inclusion in the human diet of a quantity (0.5 to 30 gm) of urea or ammonium salts or a combination thereof. Initially it would also be advisable, although not essential to add a bacterial culture to the diet. In this manner a human being would become capable of utilizing nitrogen from urea or ammonia, both extremely cheap sources. Whereas there is considerable evidence that human beings, especially infants, are capable of metabolizing urea and ammonium salts as a source of nonessential amino acid nitrogen, a considerable quantity of the urea ingested could be used by intestinal bacterial. The ingestion of a particular strain suitable for symbiotic existence with human beings would be necessary only once. Starchy foods found in profusion in the diets of many kwashiokor victims would provide the necessary energy for the synthesis of protein by microorganism within the human digestive tract. Since the quantity of nitrogen egested in the feces is quite constant for those whose diet is at subsistance levels with respect to protein, the added nitrogen in the form of urea or ammonium salts or easily synthesized amino acids would be utilized by the kwashiokor victim.

In addition to the nitrogen compound a smaller amount of other cheap inorganic or simple organic nutrients may be included in the diet; these include phophates, calcium, potassium, sulfates, salt, magnesium, and extremely small amounts of iodine, iron, copper, molybdenum, and cobalt. The efficency of these nutrients lies in the same principle as the synthesis of proteins and other nutritionally valuable materials in large vats to which waste materials are added as "food" as described above. This method of supplementing the diets of human beings has the advantage of being extremely cheap. In addition, unlike other dietary supplements such as milk and fish protein, this supplement is hardly suitable for hoarding. To take more than the usual doses at any one time would result in severe illness or even death; the rich could hardly benefit by stealing this form of relief from the poor. The manner is which the supplement could be administered would have to preclude the possibility of an overdose; this dietary supplement must be considered to be a drug or medicine that combats the disease of hunger and starvation. It could be administered at schools or at special centers in areas of Africa and India stricken by kwashiokor. Because of the relatively small volume of supplements needed, it would not interfere with eating habits or economic situation of an area where it is used.

One important feature in the process of growing bacteria and other microorganisms on waste materials consists in recycling a portion of the syntheized amino acid. The addition of amino acids to an in vitro system of rumen bacteria increases the rate of growth and the extent of the utilization of cellulose. Although the bacteria present can sythesize protein from inorganic sources of nitrogen, the only possible explanation for this fact is to assume that some amino acids are either not synthesized by certain strains of bacteria or else they are synthesized very slowly due to some deficiency. By hydrolyzing a portion of the synthesized bacterial protein, it becomes possible to increase the overall protein synthesis rate when the resulting amino acids are added to the system. The bacteria thus share their amino acids and make up for any deficiency one or two particular strains may have otherwise as a result of a mutation.

One important aspect of this invention is the ability of this biosystem to change in time. Whereas natural mutations would tend to produce different properties for the new generations of bacteria, it is also possible to induce mutations by means of radiation or mutagenic compounds and to keep conditions in the system that should favor one particular type of mutation. Not only could the efficiency of the fermentation process improve as the microorganisms adapt themselves to the prevailing conditions, but even the products obtained from the bacteria could be changed, so that either the yield or the variety of products would be economically expedient.

One example of adaptation among bacteria that is very useful is the increasing ability of the bacteria to utilize inorganic sources of nitrogen. By exposing bacteria to ever increasing concentrations of ammonium salts, it is comparatively easy to achieve the adaptation of the bacteria to ammonia as a source of nitrogen, replacing amino acids. In this case, the ability of utilizing ammonia probably always existed, but since the bacteria had no need to synthesize amino acids so long as there was a plentiful supply, the proper enzymes did not exist in quantity and were not put to work for synthesis.

The fact that this biosystem contains at least two tanks 12 and 14, where microorganisms can grow and reproduce is important to the continuation of strong, viable strains of bacteria. Should the first tank become infested with a particularly harmful variety of bacteriophage, the contents therein could be subjected to sterilization or disinfection by means of either electrohydraulic shock or exposure to heat. Using electrohydraulic shock, an extremely high voltage, rapidly oscillating electric current would be sent through the system. By this means, the bacteria, which respond to electric charges, would soon be torn apart or otherwise inactivated. Even viruses and bacteriophage would be destroyed by this means. The advantage of electrohydraulic shock over heat as a means of killing microorganisms, is that less energy is needed in order to kill them, hence there is less expense in areas where electricity is competitively priced. In addition, the bacteria, although killed or inactivated, are not utterly destroyed; the enzymes remain active. It should be noted that currents of more than five hundred volts and oscillations greater than one hundred per second can also be used as an alternative to the autoclaving described above in producing the final product.

In some cases it may be advisable to dispose of a particularly bad prefermentation lot that may happen to develop in the first fermentation tank. A disinfectant could be added in order to destroy any noxious microorganisms. Because the volume of the second tank 14 can be considerably greater than the volume of the first tank 12 is is possible to add a lethal amount of a disinfectant to the first tank, such as sodium hypochlorite, then wait until the disinfectant is used up, and finally to use the resulting sterile mash for fermentation in the second tank because the disinfectant would be so diluted by that time that it would not effect the growth of bacteria.

One important alternative system involves the use of a different type of bacteria and a different type of substrate. In this system sulfur bacteria are used to convert a substrate of sulfur or sulfur compounds into sulfuric acid. Oxygen must also be present in order for the oxidation to take place. Although sulfur bacteria are resistant to pH levels as low as 1.0 it is possible to concentrate the sulfuric acid by means of an electrodialysis apparatus or merely by distillation. The yield of protein and carbon, which is converted from carbon dioxide (which also must necessarily be present) into food would represent an energy conversion efficiency of up to 10 percent. There would be practically no danger of contamination with pathogenic bacteria, because of the unique medium in which sulfur bacteria grow. Air blasts blown into the medium are used in order to supply oxygen and the agitation necessary so that a maximum growth rate occurs. It should be noted that this method of protein synthesis is completely independent of photosynthesis: the energy of the bacteria is derived from chemical oxidation of inorganic sulfur compounds or elemental sulfur.

The autotrophic bacteria are also capable of digesting and utilizing other sulfur compounds, including thiosulfates, sulfites, sulfides, and pyrites. The rate of growth of sulfur bacteria or such substrates is comparable to the growth rates of cellulolytic bacteria; thus this method provides a competitive and unique way by which food and sulfuric acid may be produced.

In the case of sulfide or pyrite ores this process would prove extremely useful for the production of metals and purified metallic ores without the usual pollution of sulfurous gases that accompanies smelting. It would be necessary to grind the ore to as small a particle size as is practical. Additional agitation in the fermentation container would be necessary to insure maximum contact with the substrate.

Hydrogen sulfide is also a good source of energy for sulfur bacteria; the gas coming from a volcano would serve as an excellent nutrient for the bacteria because, in addition to high-energy sulfurous gases contained therein, ammonia in volcanic gases could supply the nitrogen requirements of the sulfur bacteria, and other nutrients (e.g., phosphates, potassium, calcium, and magnesium) are often associated with volcanos. Thus it would be possible to set up a natural protein-sulfuric acid plant at the mouth of a smoking, dormant volcano, or wherever volcanic gas is available. Merely by including a suitable water source, which may be sprayed into the volcanic-air atmosphere, it would be possible to obtain a plant that would require a minimum of labor to operate. Periodic harvests (perhaps weekly) of the bacterial suspension and sulfur products would be almost all the necessary maintenance.

Natural gas and coal gas may be bubbled through a system of sulfur bacteria, which would extract only the sulfurous gases, ammonia, carbon dioxide and oxygen in the natural gas or coal gas. By this means such fuel gases could be cleansed of impurities that otherwise would increase air pollution. Once passed through a battery of sulfur bacteria containers, the gas would be substantially free of sulfur, carbon dioxide, which reduces the efficiency of fuel gas, ammonia, and oxygen. It might be necessary to add air or oxygen to the gas at the outset in low percentages. The oxygen would be absorbed and utilized by the sulfur bacteria before the gas reached the end of the battery of biological scrubbers, and if air were used the nitrogen content increase would be neglible. Only enough oxygen need be added so that just the sulfur is oxidized.

A similar arrangement is possible for the removal of sulfur from oil. At a time of growing concern over the sulfur content of fuel and heating oils, this would provide an economical way by which the sulfur could be removed. The oil would have to be in small droplets so that its sulfur content is available to the bacteria. An inert emulsifying agent could help insure contact of the oil with the aqueous-bacteria phase. Although a similar arrangement is possible for extracting the sulfur from coal, it would be necessary to grind the coal or otherwise insure that the sulfur could be taken out. One method for removing the sulfur from coal consists in heating the coal so that the sulfur present is driven off. Whereas the boiling of sulfur is 444.6° Centigrade, many of the sulfurous components of coal would be driven off at moderate temperature; hydrogen present in the coal would tend to combine with the sulfur to form hydrogen sulfide. Grinding the coal would tend to be both expensive and less effective as a method of making the sulfur available to bacteria. It should be noted that whereas the energy conversion efficiency of sulfur bacteria seems to be low, it compares favorably with the efficiency of photosynthesis in green plants.

Another important variation in the process of obtaining food and useful by-products by means of the microbial decomposition of waste materials or abundant energy-rich materials consists of using hydrogen and hydrocarbons as substrates for oxidation by bacteria or yeast. Compared to the sulfur bacteria the autotrophic hydrogen bacteria are approximately four times as efficient in the use of available energy. Thus the yield is near 30 percent for hydrogen bacteria. Even when in low, otherwise unusable concentrations, the hydrogen can be utilized in a manner analogous to the scrubbing of sulfurous gases.

Certain bacteria are capable of using hydrocarbons as substrates for energy. A wide range of hydrocarbons are suitable as substrate. The two difficulties involved in utilizing hydrocarbons as a source of energy are first that being nearly insoluble in water, the hydrocarbon is inaccessible to the bacteria that can act upon it and secondly, in the case of higher hydrocarbons (oils) there is a problem separating the bacteria-containing valuable food from the oily mixture. In accordance with a feature of the invention, oil shale is used directly as a substrate for the growth of microorganisms: bacteria are better adapted for growth on this type of medium than they are for growing in oil. Oil and water tend to form two distinct layers, and bacteria which need both can survive and reproduce only at or near the interface. Violent agitation has been suggested as a means for increasing the surface area of the oil-water interface. The oil shale is first comminuted so that the particles are fine enough to form a suspension in water. Depending on how fine they are, a more or less violent agitation is applied to the system so that the particles do not fall out of suspension. Air is supplied so that the hydrocarbon-utilizing bacteria can grow rapidly. Other conditions including the proper mineral content are assumed. This method of culturing bacteria makes use of an extremely abundant mineral that otherwise has little economic value. A certain amount of oil can also be recovered from this process. Carbon dioxide, one of the primary waste products can be extracted and bottled, if economics warrant. The use of an emulsifying agent may be used in order to achieve intimate contact between the hydrocarbon and bacteria. Some of the hydrocarbons can be converted into derivitives thereof including higher alcohols and the carboxylic acids. These too may be utilized by the bacteria and yeast.

One advantage to the system of anaerobic fermentation using cellulolytic microorganisms is the possibility it opens for the utilization of algae including both unicellular microscopic algae such as Chlorella and also the algae of seaweed. Algae is practically the only variety of green plant that does not contain lignin in any significant quantity. One of the great problems in utilizing algal food is the thick cell wall of the algae which prevents it from being digested by man to anything near its nutritional potential and also makes the extraction of protein difficult. By means of the ability of cellulolytic microorganisms the obstructing matter of the algae will not prevent the full utilization of its food value once the microorganisms have acted. Although cellulolytic microorganisms of the types already mentioned may be capable of digesting algae, it is possible to obtain algae-utilizing microorganism from a breed of sheep in the Hebrides where they have adapted themselves to eating a diet consisting solely of sea weed. In addition, the flora in the digestive tracts of certain whales, and other aquatic animals may be used. This possibility opens up prospects for the disposal of sewage several hundred miles off a coast. A city with a large sewage disposal problem that is on or near the coast could tow sewage out to sea where it would be dropped at an algae farm. The nutrients contained in the sewage would cause a prolific growth of algae as is too well known from our polluted lakes and rivers. The algae could then be harvested and processed right on board ship or it could be taken back to a chemical factory for processing. Useful products already obtained from algae may be extracted. These include agar agar and alginic acid. The residue may then be subjected to fermentation that will consume the obstructing cellulose and other matter. The final products may then be extracted as has been described. Wherever there are growths of algae, which are prolific and generally for that reason a nuissance, it becomes possible to harvest them and use them as a source of food. Because the harvesting of algae will take nutrients out of a polluted system, less will remain for the putrefaction of that aquatic system.

I claim:

1. A method for the utilization of biodegradable material comprising
   a. forming an aqueous suspension of comminuted biodegradable waste materials mixed with a microbiological system of a plurality of several types of microorganisms;
   b. maintaining said suspension in a fermentation tank under conditions for microbial metabolic action to decompose said waste materials in suspension;
   c. removing from said tank, during and after said metabolic action the gaseous productions of said metabolic action and the portion of said suspension resistant to microbial action;
   d. separating solid proteineous material in said suspension after said metabolic action from the liquor of the suspension; and
   e. extracting liquor components from said liquor by electrodialysis.

2. The method in accordance with claim 1, wherein said biodegradable waste materials include cellulose and said microbiological system includes one or more cellylolytic microorganisms selected from the group including rumen microorganisms, thermophilic microorganisms, molds and fungi.

3. The method in accordance with claim 2, wherein said microbiological system is maintained at a pH $5.0 \pm 2.0$.

4. The method in accordance with claim 1, wherein said solid proteineous material in suspension is separated from the liquor by removing a portion of said suspension from said fermentation tank and treating said suspension portion to provide a pH value close to the isoelectric point of said suspension portion, whereby said solid proteineous material in suspension may coagulate and separate from said suspension liquid.

5. The method in accordance with claim 1, wherein said microbiological system is maintained in an equilibrium condition by controlling the growth of the microorganisms in said system by the ionic concentration of said suspension determined by the electrodialysis extraction of organic ions from said liquor of suspension.

6. The method in accordance with claim 5, wherein said equilibrium condition is also controlled by alkaline neutralizing agents.

7. The method in accordance with claim 5, including the step of maintaining the concentration of organic acids in said fermentation tank between 0.1 and 10 percent by weight.

8. The method in accordance with claim 1, including the step of introducing into said fermentation tank one or more antibiotics and innocula of bacteria resistant to said antibiotics, whereby non-resistant bacteria introduced by the addition of new waste material are eliminated.

9. The method in accordance with claim 1, including the step of introducing protozoa into the fermentation tank to limit the growth of pathogenic and nonproductive bacteria.

10. The method in accordance with claim 1, wherein the electrodialysis includes the steps of passing said liquor into an electrodialysis cell separated by organic ion-selective membranes from an adjacent cell, establishing a d.c. potential serially through said cells to concentrate organic acid and salt ions in said adjacent cell.

11. The method in accordance with claim 10, wherein said organic ion selective membranes are made by forming cellulosic esters of organic acids and fabricating said membranes from cellulose including a selected one of said cellulosic esters.

12. The method in accordance with claim 10, wherein said organic selective membranes are formed by heating one of the anhydrides of propionic acid, acetic acid or lactic acid with cellulose with or without the presence of sulfuric acid, glacial acetic acid, or pure propionic acid, and fabricating the resulting material into thin membranous sheets.

13. The method in accordance with claim 10, wherein said organic selective membranes are formed by treating cellophane with glacial acetic acid for about 12 hours at room temperature to become selective to acetate ions.

14. The method in accordance with claim 10, including the step of passing said liquor continuously into said electrodialysis cell and continuously removing concentrated acid and salt ions from said adjacent cell.

15. The method in accordance with claim 14, including the step of returning spent liquor from said electrodialysis cell to said fermentation tank.

16. The method in accordance with claim 1, including the step of passing said liquor into a plurality of electrodialysis cells each separated from a different adjacent cell by a membrane selective to a different organic ion, whereby said different organic ions are removed from said liquor and concentrated in different adjacent cells.

17. The method in accordance with claim 5, wherein the equilibrium of the microbiological system is maintained by controlling the rate of liquor flowing through said electrodialysis apparatus and returned to said fermentation tank.

18. The method in accordance with claim 1, including the step of adding one or more steering agents to said suspension to control the type and yield of said products of fermentation.

19. The method in accordance with claim 1, including the step of adding a derivative of acetic acid as a steering agent to said suspension to inhibit acetic acid production as a product of fermentation.

20. The method in accordance with claim 1, including the step of adding small quantities of carbon tetrachloride to said suspension to inhibit methane production as a product of fermentation.

21. The method in accordance with claim 1, wherein said microbiological system is retained in an equilibrium condition by controlling the following factors, (a) the nature and concentration of the substrate, (b) the type of bacteria used in said system, (c) the amount and kind or steering agents used, (d) the rate of withdrawal of organic acids from said system by electrodialysis, and the concentration of alkali metal ions to control the pH of said system.

22. The method in accordance with claim 21, wherein said equilibrium condition is maintained by holding the concentration of organic acids in the system between 0.1 and 10 percent.

23. The method in accordance with claim 1, wherein said liquor includes alcohols and acetone, including the steps of removing said alcohols and acetone from said liquor by mixing said liquor with gasoline to dissolve the alcohols and acetone in the gasoline, and separating said alcohol, acetone and gasoline mixture from said liquor.

24. The method in accordance with claim 1, wherein said solid proteineous material separated from said suspension is processed into food by autolyzing by the step of electrohydraulic shock to release enzymes from the bacteria in said proteineous material.

25. The method in accordance with claim 24, wherein said solid proteineous material is processed into food by autolyzing said material by the step of exposing said material to a high voltage alternating potential to disrupt the lysosomes of said bacteria in said proteineous material.

26. The method in accordance with claim 1, wherein said porteineous material is processed into food by forming said proteineous material into fibers.

27. The method in accordance with claim 1, wherein said proteineous material is processed into food by the steps of forming a concentrated solution of said proteineous material, forcing said concentrated solution through spinnerets into pure cold water to coagulate said proteineous material into fibers, and binding the fibers together with gelatin.

28. The method in accordance with claim 1, wherein said proteineous material is processed by the steps of adding to said proteineous material cheese curing bacteria and molds, adding to the proteineous material one or more of a curdled proteineous material, a polysaccharide or derivative thereof, starch, or a cellulose derivative.

29. The method in accordance with claim 1, wherein said proteineous material is processed by the step of composting said material to break down portions of said proteineous material resistant to bacterial action, and processing the composted proteineous material by repeating the method steps (a) through (e).

30. A method in accordance with claim 1, wherein said aqueous suspension includes sulfur or sulfur compounds and sulfur bacteria are included in said aqueous suspension to convert the sulfur and sulfur compounds to sulfuric acid as a product of said fermentation.

31. The method in accordance with claim 30, wherein said sulfur compounds include finely ground sulfide ores, and said suspension is agitated by bubbling through said suspension one or more of hydrogen sulfide gas, the gases obtained from volcanic action, natural gas, and coal gas.

32. The method in accordance with claim 30, wherein said sulfur compounds are contained in oil and said suspension includes an emulsion of said oil.

33. The method in accordance with claim 30, wherein said sulfur compounds are contained in coal and said suspension includes said coal in a finely divided state.

34. The method in accordance with claim 1, wherein said aqueous suspension includes a hydrocarbon oil and hydrogen bacteria or yeast, and the method includes the step of agitating the suspension to increase the oil-water interface.

35. The method in accordance with claim 34, wherein the hydrocarbon oil is contained in oil shale, and the method includes the step of comminuting the oil shale to a fineness providing a suspension of said shale in water.

36. The method in accordance with claim 35, wherein an emulsifying agent is added to the suspension of fine shale particles to increase the oil-water interface.

37. The method in accordance with claim 1, wherein said aqueous suspension includes resistant organic material, said method including the steps of separating said resistant organic material from said suspension, processing said resistant organic material by forming a compost of said organic material, adding nutrients to said compost to break down portions of said organic material resistant to bacterial action to form a proteinaceous product, hydrolyzing the proteinaceous product with hot acid or alkali, or by means of enzymes.

* * * * *